US012776223B2

(12) United States Patent
Morrison et al.

(10) Patent No.: US 12,776,223 B2
(45) Date of Patent: Oct. 27, 2026

(54) TRAINING ATTACHMENT FOR AN ELECTRODE OF A CONDUCTED ELECTRICAL WEAPON

(71) Applicant: Axon Enterprise, Inc., Scottsdale, AZ (US)

(72) Inventors: Regan T. Morrison, Phoenix, AZ (US); Samuel R. Driscoll, Phoenix, AZ (US); John Groff, San Francisco, CA (US)

(73) Assignee: AXON ENTERPRISE, INC., Scottsdale, AZ (US)

(*) Notice: Subject to any disclaimer, the term of this patent is extended or adjusted under 35 U.S.C. 154(b) by 464 days.

(21) Appl. No.: 18/223,763

(22) Filed: Jul. 19, 2023

(65) Prior Publication Data

US 2024/0038093 A1 Feb. 1, 2024

Related U.S. Application Data

(60) Provisional application No. 63/393,062, filed on Jul. 28, 2022.

(51) Int. Cl.
*G09B 19/00* (2006.01)
*F41H 13/00* (2006.01)

(52) U.S. Cl.
CPC ......... *G09B 19/00* (2013.01); *F41H 13/0012* (2013.01)

(58) Field of Classification Search
CPC ............................ G09B 19/00; F41H 13/0012
USPC ............................................................ 463/47
See application file for complete search history.

(56) References Cited

U.S. PATENT DOCUMENTS

| | | | |
|---|---|---|---|
| 4,735,612 | A | 4/1988 | Chevalier |
| 4,863,428 | A | 9/1989 | Chevalier |
| 5,333,881 | A | 8/1994 | Cugliari |
| 6,062,997 | A | 5/2000 | Seymour |

(Continued)

FOREIGN PATENT DOCUMENTS

| | | | |
|---|---|---|---|
| CN | 102016486 | A | 4/2011 |
| TW | I326352 | B | 6/2010 |

(Continued)

OTHER PUBLICATIONS

International Searching Authority, International Search Report for International Application No. PCT/US2023/028126 mailed Nov. 3, 2023.

(Continued)

*Primary Examiner* — Xuan M Thai
*Assistant Examiner* — Lisa H Antoine
(74) *Attorney, Agent, or Firm* — Justin Powley

(57) ABSTRACT

An electrode for a conducted electrical weapon may comprise an electrode body and an electrode head coupled to a first end of the electrode body. A training attachment may be coupled to the electrode head. The training attachment may comprise an attachment elongated extension opposite an attachment base. The training attachment may comprise a plurality of wings coupled to a forward surface of the attachment elongated extension. The plurality of wings may be configured to operate from a first position to a second position responsive to an impact of the training attachment with a target. The plurality of wings may comprise mating surfaces configured to couple to the target.

20 Claims, 4 Drawing Sheets

(56) References Cited

U.S. PATENT DOCUMENTS

| | | | | |
|---|---|---|---|---|
| 7,237,352 | B2 | 7/2007 | Keely | |
| 7,520,081 | B2 | 4/2009 | Kroll | |
| 8,074,573 | B1 | 12/2011 | Linker | |
| 8,342,098 | B2 | 1/2013 | Cugliari | |
| 9,125,389 | B1 | 9/2015 | Calvert | |
| 10,066,906 | B2 | 9/2018 | Heroor et al. | |
| 10,082,361 | B2 | 9/2018 | Forsythe et al. | |
| 10,627,195 | B2 | 4/2020 | Nerheim et al. | |
| 10,712,136 | B2 | 7/2020 | Salisbury et al. | |
| 11,187,504 | B2 | 11/2021 | Salisbury et al. | |
| 11,662,188 | B2 | 5/2023 | Salisbury et al. | |
| 2006/0187610 | A1 | 8/2006 | Su | |
| 2007/0101893 | A1 | 5/2007 | Shalev et al. | |
| 2007/0234924 | A1 | 10/2007 | Hendrix | |
| 2011/0176250 | A1 | 7/2011 | Hinz et al. | |
| 2015/0018143 | A1 | 1/2015 | Chia | |
| 2016/0015499 | A1 | 1/2016 | Scott et al. | |
| 2017/0160060 | A1 | 6/2017 | Purvis | |
| 2018/0306560 | A1 * | 10/2018 | Salisbury, Jr. | F42B 8/12 |
| 2020/0292286 | A1 | 9/2020 | Salisbury et al. | |
| 2021/0364256 | A1 | 11/2021 | Pirc et al. | |
| 2022/0196371 | A1 | 6/2022 | Zekanovic et al. | |
| 2023/0148190 | A1 | 5/2023 | Nemtyshkin et al. | |

FOREIGN PATENT DOCUMENTS

| | | | |
|---|---|---|---|
| WO | 2006135403 | A2 | 12/2006 |
| WO | 2009005541 | A1 | 1/2009 |

OTHER PUBLICATIONS

European Patent Office, Extended Search Report for European Patent Application EP 17905975, p. 1-7.

International Searching Authority, International Search Report for the International Patent Application No. PCT/US2017/047177 mailed Jan. 8, 2018.

European Patent Office, Communication Pursuant to Article 94(3) EPC for European Application No. 17905975.3-1005 mailed Feb. 7, 2022.

U.S. Appl. No. 18/203,571, filed May 30, 2023, Applicant: Axon Enterprise, Inc., First Named Inventor: Luke A. Salisbury.

Taiwanese Patent Office, Office Action for Taiwan Application No. 112127496 mailed May 20, 2024.

European Patent Office, Extended European Search Report for European Patent Application No. 23847193.2, mailed Jun. 10, 2026.

* cited by examiner

TRAINING ATTACHMENT FOR AN ELECTRODE OF A CONDUCTED ELECTRICAL WEAPON

FIELD OF THE INVENTION

Embodiments of the present disclosure relate to a conducted electrical weapon ("CEW").

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
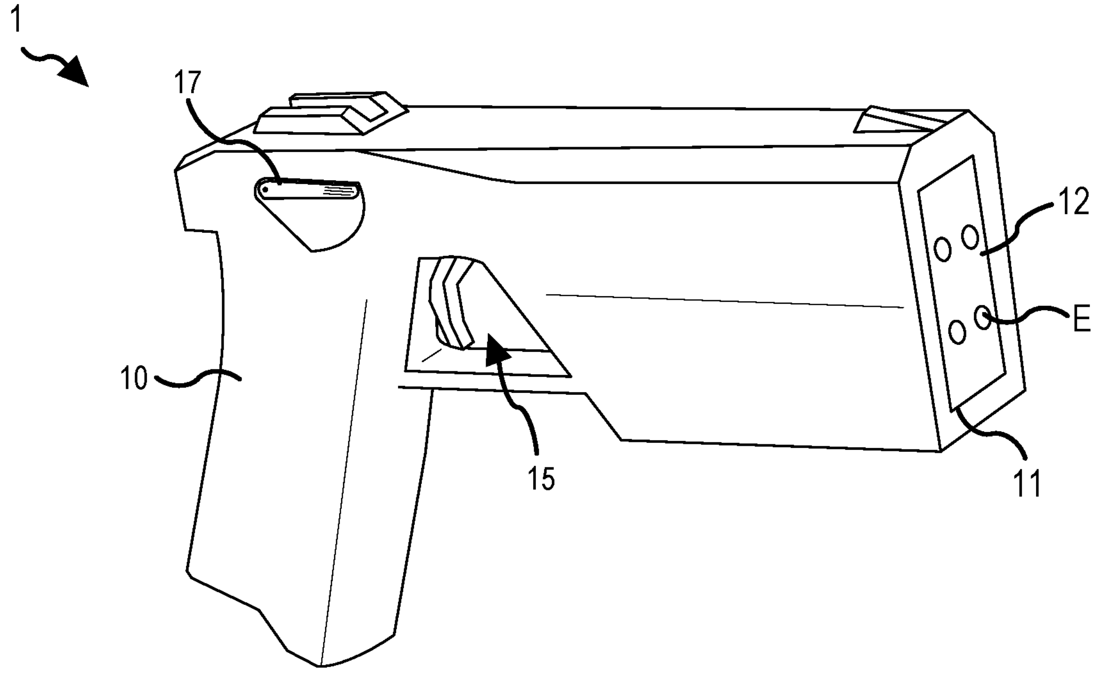
FIG. 1 is a perspective view of a conducted electrical weapon ("CEW"), in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Surface shading lines may be used throughout the figures to denote different parts but not necessarily to denote the same or different materials.

Systems, methods, and apparatuses may be used to interfere with voluntary locomotion (e.g., walking, running, moving, etc.) of a target. For example, a CEW may be used to deliver a current (e.g., stimulus signal, pulses of current, pulses of charge, etc.) through tissue of a human or animal target. Although typically referred to as a conducted electrical weapon, as described herein a "CEW" may refer to a conducted electrical weapon, a conducted energy weapon, an electronic control device, and/or any other similar device or apparatus configured to provide a stimulus signal through one or more deployed projectiles (e.g., electrodes).

A stimulus signal carries a charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion of the target.

A stimulus signal may be delivered through the target via terminals coupled to the CEW. Delivery via terminals may be referred to as a local delivery (e.g., a local stun, a drive stun, etc.). During local delivery, the terminals are brought close to the target by positioning the CEW proximate to the target. The stimulus signal is delivered through the target's tissue via the terminals. To provide local delivery, the user of the CEW is generally within arm's reach of the target and brings the terminals of the CEW into contact with or proximate to the target.

A stimulus signal may be delivered through the target via one or more (typically at least two) wire-tethered electrodes. Delivery via wire-tethered electrodes may be referred to as a remote delivery (e.g., a remote stun). During a remote delivery, the CEW may be separated from the target up to the length (e.g., 15 feet, 20 feet, 30 feet, etc.) of the wire tether. The CEW launches the electrodes towards the target. As the electrodes travel toward the target, the respective wire tethers deploy behind the electrodes. The wire tether electrically couples the CEW to the electrode. The electrode may electrically couple to the target thereby coupling the CEW to the target. In response to the electrodes connecting with, impacting on, or being positioned proximate to the target's tissue, the current may be provided through the target via the electrodes (e.g., a circuit is formed through the first tether and the first electrode, the target's tissue, and the second electrode and the second tether).

Terminals or electrodes that contact or are proximate to the target's tissue deliver the stimulus signal through the target. Contact of a terminal or electrode with the target's tissue establishes an electrical coupling (e.g., circuit) with the target's tissue. Electrodes may include a spear that may pierce the target's tissue to contact the target. A terminal or electrode that is proximate to the target's tissue may use ionization to establish an electrical coupling with the target's tissue. Ionization may also be referred to as arcing.

In use (e.g., during deployment), a terminal or electrode may be separated from the target's tissue by the target's clothing or a gap of air. In various embodiments, a signal generator of the CEW may provide the stimulus signal (e.g., current, pulses of current, etc.) at a high voltage (e.g., in the range of 40,000 to 100,000 volts) to ionize the air in the clothing or the air in the gap that separates the terminal or electrode from the target's tissue. Ionizing the air establishes a low impedance ionization path from the terminal or electrode to the target's tissue that may be used to deliver the stimulus signal into the target's tissue via the ionization path. The ionization path persists (e.g., remains in existence, lasts, etc.) as long as the current of a pulse of the stimulus signal is provided via the ionization path. When the current ceases or is reduced below a threshold (e.g., amperage, voltage), the ionization path collapses (e.g., ceases to exist) and the terminal or electrode is no longer electrically coupled to the target's tissue. Lacking the ionization path, the impedance between the terminal or electrode and target tissue is high. A high voltage in the range of about 50,000 volts can ionize air in a gap of up to about one inch.

A CEW may provide a stimulus signal as a series of current pulses. Each current pulse may include a high voltage portion (e.g., 40,000-100,000 volts) and a low voltage portion (e.g., 500-6,000 volts). The high voltage portion of a pulse of a stimulus signal may ionize air in a gap between an electrode or terminal and a target to electrically couple the electrode or terminal to the target. In response to the electrode or terminal being electrically coupled to the target, the low voltage portion of the pulse delivers an amount of charge into the target's tissue via the ionization path. In response to the electrode or terminal being electrically coupled to the target by contact (e.g., touching, spear embedded into tissue, etc.), the high portion of the pulse and the low portion of the pulse both deliver charge to the target's tissue. Generally, the low voltage portion of the pulse delivers a majority of the charge of the pulse into the target's tissue. In various embodiments, the high voltage portion of a pulse of the stimulus signal may be referred to as the spark or ionization portion. The low voltage portion of a pulse may be referred to as the muscle portion.

In various embodiments, a signal generator of the CEW may provide the stimulus signal (e.g., current, pulses of current, etc.) at only a low voltage (e.g., less than 2,000 volts). The low voltage stimulus signal may not ionize the air in the clothing or the air in the gap that separates the terminal or electrode from the target's tissue. A CEW having a signal generator providing stimulus signals at only a low voltage (e.g., a low voltage signal generator) may require deployed electrodes to be electrically coupled to the target by contact (e.g., touching, spear embedded into tissue, etc.).

A CEW may include at least two terminals at the face of the CEW. A CEW may include two terminals for each bay that accepts a magazine. The terminals are spaced apart from each other. In response to the electrodes of the magazine in the bay having not been deployed, the high voltage impressed across the terminals will result in ionization of the air between the terminals. The arc between the terminals may be visible to the naked eye. In response to a launched electrode not electrically coupling to a target, the current that would have been provided via the electrodes may arc across the face of the CEW via the terminals.

The likelihood that the stimulus signal will cause NMI increases when the electrodes that deliver the stimulus signal are spaced apart at least 6 inches (15.24 centimeters) so that the current from the stimulus signal flows through the at least 6 inches of the target's tissue. In various embodiments, the electrodes preferably should be spaced apart at least 12 inches (30.48 centimeters) on the target. Because the terminals on a CEW are typically less than 6 inches apart, a stimulus signal delivered through the target's tissue via terminals likely will not cause NMI, only pain.

A series of pulses may include two or more pulses separated in time. Each pulse delivers an amount of charge into the target's tissue. In response to the electrodes being appropriately spaced (as discussed above), the likelihood of inducing NMI increases as each pulse delivers an amount of charge in the range of 55 microcoulombs to 71 microcoulombs per pulse. The likelihood of inducing NMI increases when the rate of pulse delivery (e.g., rate, pulse rate, repetition rate, etc.) is between 11 pulses per second ("pps") and 50 pps. Pulses delivered at a higher rate may provide less charge per pulse to induce NMI. Pulses that deliver more charge per pulse may be delivered at a lesser rate to induce NMI. In various embodiments, a CEW may be hand-held and use batteries to provide the pulses of the stimulus signal. In response to the amount of charge per pulse being high and the pulse rate being high, the CEW may use more energy than is needed to induce NMI. Using more energy than is needed depletes batteries more quickly.

Empirical testing has shown that the power of the battery may be conserved with a high likelihood of causing NMI in response to the pulse rate being less than 44 pps and the charge per a pulse being about 63 microcoulombs. Empirical testing has shown that a pulse rate of 22 pps and 63 microcoulombs per a pulse via a pair of electrodes will induce NMI when the electrode spacing is at least 12 inches (30.48 centimeters).

In various embodiments, a CEW may include a handle and one or more magazines. The handle may include one or more bays for receiving the magazine(s). Each magazine may be removably positioned in (e.g., inserted into, coupled to, etc.) a bay. Each magazine may releasably electrically, electronically, and/or mechanically couple to a bay. A deployment of the CEW may launch one or more electrodes from the magazine and toward a target to remotely deliver the stimulus signal through the target.

In various embodiments, a magazine may include two or more electrodes (e.g., projectiles, etc.) that are launched at the same time. In various embodiments, a magazine may include two or more electrodes that may each be launched individually at separate times. In various embodiments, a magazine may include a single electrode configured to be launched from the magazine. Launching the electrodes may be referred to as activating (e.g., firing) a magazine or electrode. In some embodiments, after use (e.g., activation, firing), a magazine may be removed from the bay and the used electrodes may be removed from the magazine and replaced with unused (e.g., not fired, not activated) electrodes. The magazine may be inserted into the bay again to permit launch of additional electrodes. In some embodiments, after use (e.g., activation, firing), a magazine may be removed from the bay and replaced with an unused (e.g., not fired, not activated) magazine to permit launch of additional electrodes.

Figure 2:
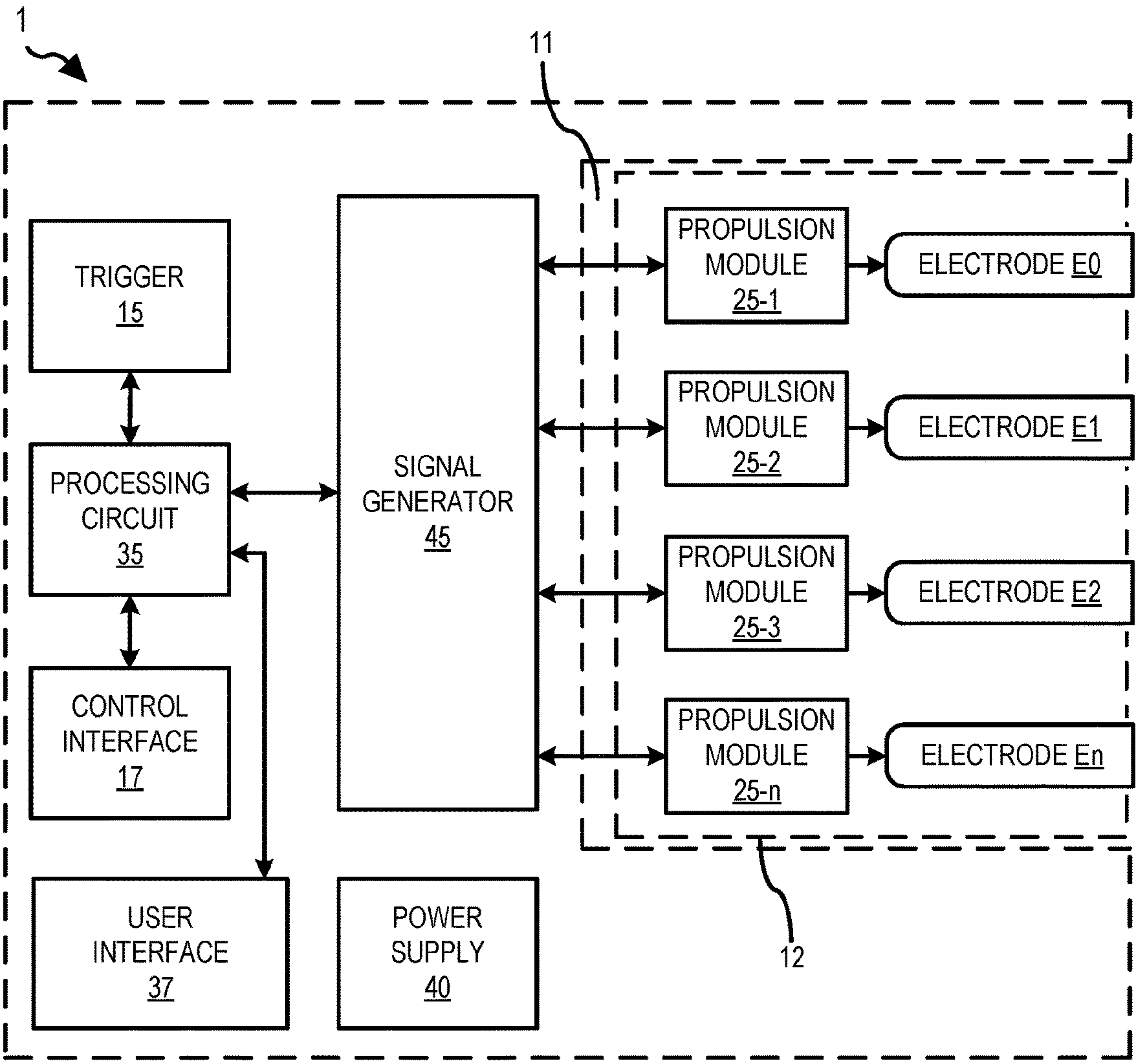
FIG. 2 is a schematic view of a CEW, in accordance with various embodiments.

In various embodiments, and with reference to FIGS. 1 and 2, a CEW 1 is disclosed. CEW 1 may be similar to, or have similar aspects and/or components with, any CEW discussed herein. CEW 1 may comprise a housing 10 and a magazine 12. It should be understood by one skilled in the art that FIG. 2 is a schematic representation of CEW 1, and one or more of the components of CEW 1 may be located in any suitable position within, or external to, housing 10.

Housing 10 may be configured to house various components of CEW 1 that are configured to enable deployment of magazine 12, provide an electrical current to magazine 12, and otherwise aid in the operation of CEW 1, as discussed further herein. Although depicted as a firearm in FIG. 1, housing 10 may comprise any suitable shape and/or size. Housing 10 may comprise a handle end opposite a deployment end. A deployment end may be configured, and sized and shaped, to receive one or more magazine 12. A handle end may be sized and shaped to be held in a hand of a user. For example, a handle end may be shaped as a handle to enable hand-operation of CEW 1 by the user. In various embodiments, a handle end may also comprise contours shaped to fit the hand of a user, for example, an ergonomic grip. A handle end may include a surface coating, such as, for example, a non-slip surface, a grip pad, a rubber texture, and/or the like. As a further example, a handle end may be wrapped in leather, a colored print, and/or any other suitable material, as desired.

In various embodiments, housing 10 may comprise various mechanical, electronic, and/or electrical components configured to aid in performing the functions of CEW 1. For example, housing 10 may comprise one or more triggers 15, control interfaces 17, processing circuits 35, power supplies 40, and/or signal generators 45. Housing 10 may include a guard (e.g., trigger guard). A guard may define an opening formed in housing 10. A guard may be located on a center region of housing 10 (e.g., as depicted in FIG. 1), and/or in any other suitable location on housing 10. Trigger 15 may be disposed within a guard. A guard may be configured to protect trigger 15 from unintentional physical contact (e.g., an unintentional activation of trigger 15). A guard may surround trigger 15 within housing 10.

In various embodiments, trigger 15 be coupled to an outer surface of housing 10, and may be configured to move, slide, rotate, or otherwise become physically depressed or moved upon application of physical contact. For example, trigger 15 may be actuated by physical contact applied to trigger 15 from within a guard. Trigger 15 may comprise a mechanical or electromechanical switch, button, trigger, or the like. For example, trigger 15 may comprise a switch, a pushbutton, and/or any other suitable type of trigger. Trigger 15 may be mechanically and/or electronically coupled to processing circuit 35. In response to trigger 15 being activated (e.g., depressed, pushed, etc. by the user), processing circuit 35 may enable deployment of (or cause deployment of) one or more magazine 12 from CEW 1, as discussed further herein.

In various embodiments, power supply 40 may be configured to provide power to various components of CEW 1. For example, power supply 40 may provide energy for operating the electronic and/or electrical components (e.g., parts, subsystems, circuits, etc.) of CEW 1 and/or one or more magazine 12. Power supply 40 may provide electrical power. Providing electrical power may include providing a current at a voltage. Power supply 40 may be electrically coupled to processing circuit 35 and/or signal generator 45. In various embodiments, in response to a control interface comprising electronic properties and/or components, power supply 40 may be electrically coupled to the control interface. In various embodiments, in response to trigger 15 comprising electronic properties or components, power supply 40 may be electrically coupled to trigger 15. Power supply 40 may provide an electrical current at a voltage. Electrical power from power supply 40 may be provided as a direct current ("DC"). Electrical power from power supply 40 may be provided as an alternating current ("AC"). Power supply 40 may include a battery. The energy of power supply 40 may be renewable or exhaustible, and/or replaceable. For example, power supply 40 may comprise one or more rechargeable or disposable batteries. In various embodiments, the energy from power supply 40 may be converted from one form (e.g., electrical, magnetic, thermal) to another form to perform the functions of a system.

Power supply 40 may provide energy for performing the functions of CEW 1. For example, power supply 40 may provide the electrical current to signal generator 45 that is provided through a target to impede locomotion of the target (e.g., via magazine 12). Power supply 40 may provide the energy for a stimulus signal. Power supply 40 may provide the energy for other signals, including an ignition signal, as discussed further herein.

In various embodiments, processing circuit 35 may comprise any circuitry, electrical components, electronic components, software, and/or the like configured to perform various operations and functions discussed herein. For example, processing circuit 35 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processing circuit 35 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processing circuit 35 may include data buses, output ports, input ports, timers, memory, arithmetic units, and/or the like.

In various embodiments, processing circuit 35 may include signal conditioning circuity. Signal conditioning circuitry may include level shifters to change (e.g., increase, decrease) the magnitude of a voltage (e.g., of a signal) before receipt by processing circuit 35 or to shift the magnitude of a voltage provided by processing circuit 35.

In various embodiments, processing circuit 35 may be configured to control and/or coordinate operation of some or all aspects of CEW 1. For example, processing circuit 35 may include (or be in communication with) memory configured to store data, programs, and/or instructions. The memory may comprise a tangible non-transitory computer-readable memory. Instructions stored on the tangible non-transitory memory may allow processing circuit 35 to perform various operations, functions, and/or steps, as described herein.

In various embodiments, the memory may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Processing circuit 35 may be configured to provide and/or receive electrical signals whether digital and/or analog in form. Processing circuit 35 may provide and/or receive digital information via a data bus using any protocol. Processing circuit 35 may receive information, manipulate the received information, and provide the manipulated information. Processing circuit 35 may store information and retrieve stored information. Information received, stored, and/or manipulated by processing circuit 35 may be used to perform a function, control a function, and/or to perform an operation or execute a stored program.

Processing circuit 35 may control the operation and/or function of other circuits and/or components of CEW 1. Processing circuit 35 may receive status information regarding the operation of other components, perform calculations with respect to the status information, and provide commands (e.g., instructions) to one or more other components. Processing circuit 35 may command another component to start operation, continue operation, alter operation, suspend operation, cease operation, or the like. Commands and/or status may be communicated between processing circuit 35 and other circuits and/or components via any type of bus (e.g., SPI bus) including any type of data/address bus.

In various embodiments, processing circuit 35 may be mechanically and/or electronically coupled to trigger 15. Processing circuit 35 may be configured to detect an activation, actuation, depression, input, etc. (collectively, an "activation event") of trigger 15. In response to detecting the activation event, processing circuit 35 may be configured to perform various operations and/or functions, as discussed further herein. Processing circuit 35 may also include a sensor (e.g., a trigger sensor) attached to trigger 15 and configured to detect an activation event of trigger 15. The sensor may comprise any suitable sensor, such as a mechanical and/or electronic sensor capable of detecting an activation event in trigger 15 and reporting the activation event to processing circuit 35.

In various embodiments, processing circuit 35 may be mechanically and/or electronically coupled to control interface 17. Processing circuit 35 may be configured to detect an activation, actuation, depression, input, etc. (collectively, a "control event") of control interface 17. In response to detecting the control event, processing circuit 35 may be configured to perform various operations and/or functions, as discussed further herein. Processing circuit 35 may also include a sensor (e.g., a control sensor) attached to control interface 17 and configured to detect a control event of control interface 17. The sensor may comprise any suitable mechanical and/or electronic sensor capable of detecting a control event in control interface 17 and reporting the control event to processing circuit 35.

In various embodiments, processing circuit 35 may be electrically and/or electronically coupled to power supply 40. Processing circuit 35 may receive power from power supply 40. The power received from power supply 40 may be used by processing circuit 35 to receive signals, process signals, and transmit signals to various other components in CEW 1. Processing circuit 35 may use power from power supply 40 to detect an activation event of trigger 15, a control event of control interface 17, or the like, and generate one or more control signals in response to the detected events. The control signal may be based on the control event and the activation event. The control signal may be an electrical signal.

In various embodiments, processing circuit 35 may be electrically and/or electronically coupled to signal generator 45. Processing circuit 35 may be configured to transmit or provide control signals to signal generator 45 in response to detecting an activation event of trigger 15. Multiple control signals may be provided from processing circuit 35 to signal generator 45 in series. In response to receiving the control signal, signal generator 45 may be configured to perform various functions and/or operations, as discussed further herein.

In various embodiments, signal generator 45 may be configured to receive one or more control signals from processing circuit 35. Signal generator 45 may provide an ignition signal to magazine 12 based on the control signals. Signal generator 45 may be electrically and/or electronically coupled to processing circuit 35 and/or magazine 12. Signal generator 45 may be electrically coupled to power supply 40. Signal generator 45 may use power received from power supply 40 to generate an ignition signal. For example, signal generator 45 may receive an electrical signal from power supply 40 that has first current and voltage values. Signal generator 45 may transform the electrical signal into an ignition signal having second current and voltage values. The transformed second current and/or the transformed second voltage values may be different from the first current and/or voltage values. The transformed second current and/or the transformed second voltage values may be the same as the first current and/or voltage values. Signal generator 45 may temporarily store power from power supply 40 and rely on the stored power entirely or in part to provide the ignition signal. Signal generator 45 may also rely on received power from power supply 40 entirely or in part to provide the ignition signal, without needing to temporarily store power.

Signal generator 45 may be controlled entirely or in part by processing circuit 35. In various embodiments, signal generator 45 and processing circuit 35 may be separate components (e.g., physically distinct and/or logically discrete). Signal generator 45 and processing circuit 35 may be a single component. For example, a control circuit within housing 10 may at least include signal generator 45 and processing circuit 35. The control circuit may also include other components and/or arrangements, including those that further integrate corresponding function of these elements into a single component or circuit, as well as those that further separate certain functions into separate components or circuits.

Signal generator 45 may be controlled by the control signals to generate an ignition signal having a predetermined current value or values. For example, signal generator 45 may include a current source. The control signal may be received by signal generator 45 to activate the current source at a current value of the current source. An additional control signal may be received to decrease a current of the current source. For example, signal generator 45 may include a pulse width modification circuit coupled between a current source and an output of the control circuit. A second control signal may be received by signal generator 45 to activate the pulse width modification circuit, thereby decreasing a non-zero period of a signal generated by the current source and an overall current of an ignition signal subsequently output by the control circuit. The pulse width modification circuit may be separate from a circuit of the current source or, alternatively, integrated within a circuit of the current source. Various other forms of signal generators 45 may alternatively or additionally be employed, including those that apply a voltage over one or more different resistances to generate signals with different currents. In various embodiments, signal generator 45 may include a high-voltage module configured to deliver an electrical current having a high voltage. In various embodiments, signal generator 45 may include a low-voltage module configured to deliver an electrical current having a lower voltage, such as, for example, 2,000 volts.

Responsive to receipt of a signal indicating activation of trigger 15 (e.g., an activation event), a control circuit provides an ignition signal to magazine 12 (or an electrode in magazine 12). For example, signal generator 45 may provide an electrical signal as an ignition signal to magazine 12 in response to receiving a control signal from processing circuit 35. In various embodiments, the ignition signal may be separate and distinct from a stimulus signal. For example, a stimulus signal in CEW 1 may be provided to a different circuit within magazine 12, relative to a circuit to which an ignition signal is provided. Signal generator 45 may be configured to generate a stimulus signal. In various embodiments, a second, separate signal generator, component, or circuit (not shown) within housing 10 may be configured to generate the stimulus signal. Signal generator 45 may also provide a ground signal path for magazine 12, thereby completing a circuit for an electrical signal provided to magazine 12 by signal generator 45. The ground signal path may also be provided to magazine 12 by other elements in housing 10, including power supply 40.

In various embodiments, a bay 11 of housing 10 may be configured to receive one or more magazine 12. Bay 11 may comprise an opening in an end of housing 10 sized and shaped to receive one or more magazine 12. Bay 11 may include one or more mechanical features configured to removably couple one or more magazine 12 within bay 11. Bay 11 of housing 10 may be configured to receive a single magazine, two magazines, three magazines, nine magazines, or any other number of magazines.

Magazine 12 may comprise one or more propulsion modules 25 and one or more electrodes E. For example, a magazine 12 may comprise a single propulsion module 25 configured to deploy a single electrode E. As a further example, a magazine 12 may comprise a single propulsion module 25 configured to deploy a plurality of electrodes E. As a further example, a magazine 12 may comprise a plurality of propulsion modules 25 and a plurality of electrodes E, with each propulsion module 25 configured to deploy one or more electrodes E. In various embodiments, and as depicted in FIG. 2, magazine 12 may comprise a first propulsion module 25-1 configured to deploy a first electrode E0, a second propulsion module 25-2 configured to deploy a second electrode E1, a third propulsion module 25-3 configured to deploy a third electrode E2, and a fourth propulsion module 25-4 configured to deploy a fourth electrode En. Each series of propulsion modules and electrodes may be contained in the same and/or separate magazines. As referred to herein, electrodes E0, E1, E2, En may be generally referred to individually as an "electrode E" or collectively as "electrodes E." As referred to herein, propulsion modules 25-1, 25-2, 25-3, **25-*n* may be referred to individually as a "propulsion module 25" or collectively as "propulsion modules 25**."

In various embodiments, a propulsion module 25 may be coupled to, or in communication with one or more electrodes E in magazine 12. In various embodiments, magazine 12 may comprise a plurality of propulsion modules 25, with each propulsion module 25 coupled to, or in communication with, one or more electrodes E. A propulsion module 25 may comprise any device, propellant (e.g., air, gas, etc.), primer, or the like capable of providing a propulsion force in magazine 12. The propulsion force may include an increase in pressure caused by rapidly expanding gas within an area or chamber. The propulsion force may be applied to one or more electrodes E in magazine 12 to cause the deployment of the one or more electrodes E. A propulsion module 25 may provide the propulsion force in response to magazine 12 receiving an ignition signal, as previously discussed.

In various embodiments, the propulsion force may be directly applied to one or more electrodes E. For example, a propulsion force from propulsion module 25-1 may be provided directly to first electrode E0. A propulsion module 25 may be in fluid communication with one or more electrodes E to provide the propulsion force. For example, a propulsion force from propulsion module 25-1 may travel within a housing or channel of magazine 12 to first electrode E0. The propulsion force may travel via a manifold in magazine 12.

In various embodiments, the propulsion force may be provided indirectly to one or more electrodes E. For example, the propulsion force may be provided to a secondary source of propellant within propulsion system 125. The propulsion force may launch the secondary source of propellant within propulsion system 125, causing the secondary source of propellant to release propellant. A force associated with the released propellant may in turn provide a force to one or more electrodes E. A force generated by a secondary source of propellant may cause the one or more electrodes E to be deployed from the magazine 12 and CEW 1.

In various embodiments, an electrode E may comprise any suitable type of projectile. For example, one or more electrodes E may be or include a projectile, a probe, an electrode (e.g., an electrode dart), an entangling projectile (e.g., a tether-based entangling projectile, a net, etc.), a payload projectile (e.g., comprising a liquid or gas substance), or the like. An electrode may include a spear portion, designed to pierce or attach proximate a tissue of a target in order to provide a conductive electrical path between the electrode and the tissue, as previously discussed herein. In some embodiments, an electrode E may comprise a training attachment coupled to the front of the electrode E. The training attachment may be configured to couple to a training suit, a target, and/or the like. The training attachment may be designed to not puncture or harm the training suit, the target, and/or the like.

In various embodiments, magazine 12 may be configured to receive one or more cartridges. For example, magazine 12 may define one or more bores. A bore may comprise an axial opening through magazine 12. Each bore may be configured to receive a cartridge. Each bore may be sized and shaped accordingly to receive and house the cartridge. Each bore may comprise any suitable deployment angle. One or more bores may comprise similar deployment angles. One or more bores may comprise different deployment angles. Magazine 12 may comprise any suitable or desired number of bores, such as, for example, two bores, five bores, nine bores, ten bores, and/or the like.

A cartridge may comprise a body (e.g., a cartridge body) housing an electrode E and one or more components necessary to deploy the electrode E from the body. For example, a cartridge may comprise an electrode E and a propulsion module. The propulsion module may be similar to any other propulsion module, primer, or the like disclosed herein.

In various embodiments, a cartridge may comprise a cylindrical outer body defining a hollow inner portion. The hollow inner portion may house an electrode E (e.g., an electrode E, a spear, filament wire, etc.). The hollow inner portion may house a propulsion module configured to deploy the electrode E from a first end of the cylindrical outer body. The cartridge may include a piston positioned adjacent a second end of the electrode E. The cartridge may have the propulsion module positioned such that the piston is located between the electrode E and the propulsion module. The cartridge may also have a wad positioned adjacent the piston, where the wad is located between the propulsion module and the piston.

In various embodiments, a cartridge may comprise a contact on an end of the body. The contact may be configured to allow the cartridge to receive an electrical signal from a CEW handle. For example, the contact may comprise an electrical contact configured to enable the completion of an electrical circuit between the cartridge and a signal generator of the CEW handle. In that regard, the contact may be configured to transmit (or provide) a stimulus signal from the CEW handle to the electrode E. As a further example, the contact may be configured to transmit (or provide) an electrical signal (e.g., an ignition signal) from the CEW handle to a propulsion module within the cartridge. For example, the contact may be configured to transmit (or provide) the electrical signal to a conductor of the propulsion module, thereby causing the conductor to heat up and ignite a pyrotechnic material inside the propulsion module. Ignition of the pyrotechnic material may cause the propulsion module to deploy (e.g., directly or indirectly) the electrode E from the cartridge.

In operation, a cartridge may be inserted into a bore of magazine 12. Magazine 12 may be inserted into the bay of a CEW handle. The CEW may be operated to deploy an electrode E from the cartridge in magazine 12. Magazine 12 may be removed from the bay of the CEW handle. The cartridge (e.g., a used cartridge, a spent cartridge, etc.) may be removed from the bore of magazine 12. A new cartridge may then be inserted into the same bore of magazine 12 for additional deployments. The number of cartridges that magazine 12 is capable of receiving may be dependent on a number of bores in magazine 12. For example, in response to magazine 12 comprising ten bores, magazine 12 may be configured to receive at most ten cartridges at the same time. As a further example, in response to magazine 12 comprising two bores, magazine 312 may be configured to receive at most two cartridges at the same time.

Control interface 17 of CEW 1 may comprise, or be similar to, any control interface disclosed herein. In various embodiments, control interface 17 may be configured to control selection of firing modes in CEW 1. Controlling selection of firing modes in CEW 1 may include disabling firing of CEW 1 (e.g., a safety mode, etc.), enabling firing of CEW 1 (e.g., an active mode, a firing mode, an escalation mode, etc.), controlling deployment of magazine 12, and/or similar operations, as discussed further herein. In various embodiments, control interface 17 may also be configured to perform (or cause performance of) one or more operations that do not include the selection of firing modes. For example, control interface 17 may be configured to enable the selection of operating modes of CEW 1, selection of options within an operating mode of CEW 1, or similar selection or scrolling operations, as discussed further herein.

Control interface 17 may be located in any suitable location on or in housing 10. For example, control interface 17 may be coupled to an outer surface of housing 10. Control interface 17 may be coupled to an outer surface of housing 10 proximate trigger 15 and/or a guard of housing 10. Control interface 17 may be electrically, mechanically, and/or electronically coupled to processing circuit 35. In various embodiments, in response to control interface 17 comprising electronic properties or components, control interface 17 may be electrically coupled to power supply 40. Control interface 17 may receive power (e.g., electrical current) from power supply 40 to power the electronic properties or components.

Control interface 17 may be electronically or mechanically coupled to trigger 15. For example, and as discussed further herein, control interface 17 may function as a safety mechanism. In response to control interface 17 being set to a "safety mode," CEW 1 may be unable to launch electrodes from magazine 12. For example, control interface 17 may provide a signal (e.g., a control signal) to processing circuit 35 instructing processing circuit 35 to disable deployment of electrodes from magazine 12. As a further example, control interface 17 may electronically or mechanically prohibit trigger 15 from activating (e.g., prevent or disable a user from depressing trigger 15; prevent trigger 15 from launching an electrode; etc.).

Control interface 17 may comprise any suitable electronic or mechanical component capable of enabling selection of firing modes. For example, control interface 17 may comprise a fire mode selector switch, a safety switch, a safety catch, a rotating switch, a selection switch, a selective firing mechanism, and/or any other suitable mechanical control. As a further example, control interface 17 may comprise a slide, such as a handgun slide, a reciprocating slide, or the like. As a further example, control interface 17 may comprise a touch screen, user interface or display, or similar electronic visual component.

The safety mode may be configured to prohibit deployment of an electrode from magazine 12 in CEW 1. For example, in response to a user selecting the safety mode, control interface 17 may transmit a safety mode instruction to processing circuit 35. In response to receiving the safety mode instruction, processing circuit 35 may prohibit deployment of an electrode from magazine 12. Processing circuit 35 may prohibit deployment until a further instruction is received from control interface 17 (e.g., a firing mode instruction). As previously discussed, control interface 17 may also, or alternatively, interact with trigger 15 to prevent activation of trigger 15. In various embodiments, the safety mode may also be configured to prohibit deployment of a stimulus signal from signal generator 45, such as, for example, a local delivery.

The firing mode may be configured to enable deployment of one or more electrodes from magazine 12 in CEW 1. For example, and in accordance with various embodiments, in response to a user selecting the firing mode, control interface 17 may transmit a firing mode instruction to processing circuit 35. In response to receiving the firing mode instruction, processing circuit 35 may enable deployment of an electrode from magazine 12. In that regard, in response to trigger 15 being activated, processing circuit 35 may cause the deployment of one or more electrodes. Processing circuit 35 may enable deployment until a further instruction is received from control interface 17 (e.g., a safety mode instruction). As a further example, and in accordance with various embodiments, in response to a user selecting the firing mode, control interface 17 may also mechanically (or electronically) interact with trigger 15 of CEW 1 to enable activation of trigger 15.

In various embodiments, CEW 1 may deliver a stimulus signal via a circuit that includes signal generator 45 positioned in the handle of CEW 1. An interface (e.g., cartridge interface, magazine interface, etc.) on each magazine 12 inserted into housing 10 electrically couples to an interface (e.g., handle interface, housing interface, etc.) in handle housing 10. Signal generator 45 couples to each magazine 12, and thus to the electrodes E, via the handle interface and the magazine interface. A first filament couples to the interface of the magazine 12 and to a first electrode. A second filament couples to the interface of the magazine 12 and to a second electrode. The stimulus signal travels from signal generator 45, through the first filament and the first electrode, through target tissue, and through the second electrode and second filament back to signal generator 45.

In various embodiments, CEW 1 may further comprise one or more user interfaces 37. A user interface 37 may be configured to receive an input from a user of CEW 1 and/or transmit an output to the user of CEW 1. User interface 37 may be located in any suitable location on or in housing 10. For example, user interface 37 may be coupled to an outer surface of housing 10, or extend at least partially through the outer surface of housing 10. User interface 37 may be electrically, mechanically, and/or electronically coupled to processing circuit 35. In various embodiments, in response to user interface 37 comprising electronic or electrical properties or components, user interface 37 may be electrically coupled to power supply 40. User interface 37 may receive power (e.g., electrical current) from power supply 40 to power the electronic properties or components.

In various embodiments, user interface 37 may comprise one or more components configured to receive an input from a user. For example, user interface 37 may comprise one or more of an audio capturing module (e.g., microphone) configured to receive an audio input, a visual display (e.g., touchscreen, LCD, LED, etc.) configured to receive a manual input, a mechanical interface (e.g., button, switch, etc.) configured to receive a manual input, and/or the like. In various embodiments, user interface 37 may comprise one or more components configured to transmit or produce an output. For example, user interface 37 may comprise one or more of an audio output module (e.g., audio speaker) configured to output audio, a light-emitting component (e.g., flashlight, laser guide, etc.) configured to output light, a visual display (e.g., touchscreen, LCD, LED, etc.) configured to output a visual, and/or the like.

Figure 3A:
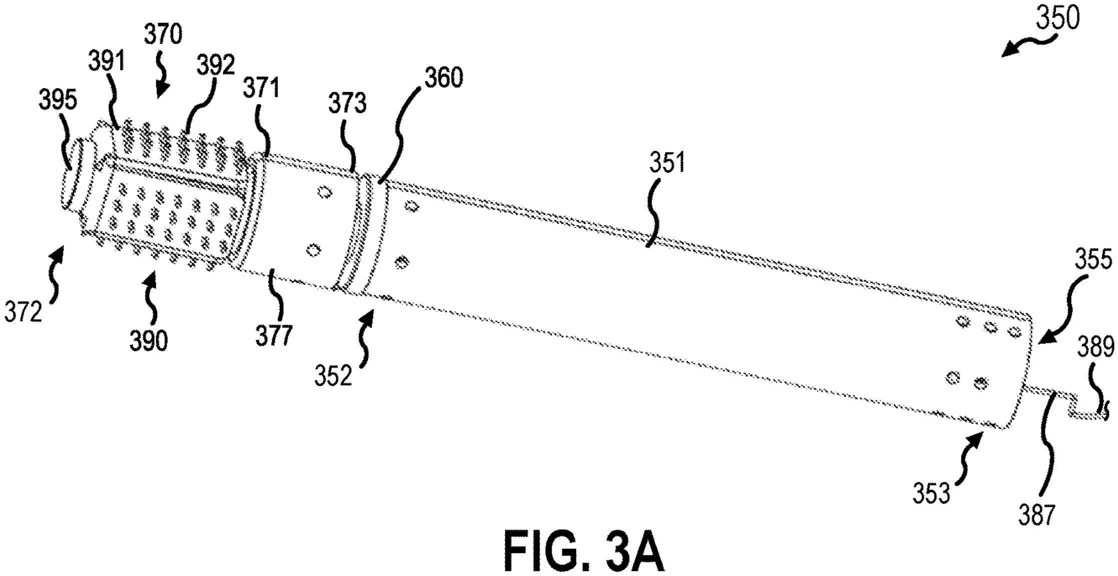
FIGS. 3A and 3B are perspective and cross-sectional views of an electrode with a training attachment in a first position, in accordance with various embodiments.
Figure 3B:
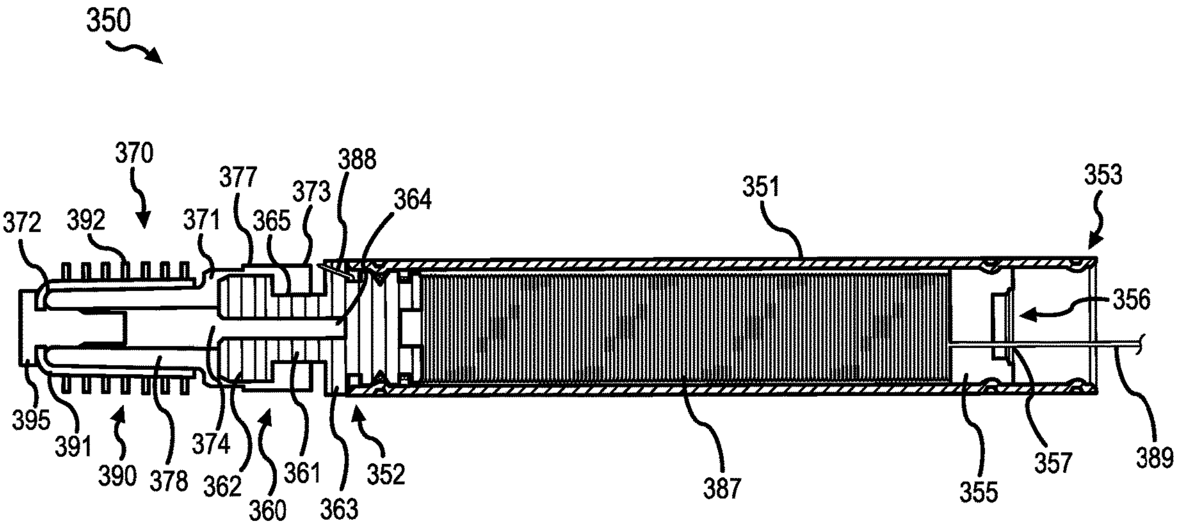

In various embodiments, and with reference to FIGS. 3A-3C, an electrode 350 is disclosed. Electrode 350 may be similar to any other electrode, projectile, or the like. Electrode 350 may be used in conjunction with any cartridge and/or magazine disclosed herein. Electrode 350 may comprise an electrode body 351 having a first end 352 (e.g., a first electrode end, a forward end, etc.) opposite a second end 353 (e.g., a second electrode end, an aft end, a rearward end, etc.). Electrode body 351 may comprise an outer surface opposite an inner surface. Electrode body 351 may define a cylindrical body. In some embodiments, a shape of electrode body 351 may be complimentary to a cartridge configured to receive electrode 350 (e.g., electrode body 351 may be complimentary with one or more inner surfaces of a cartridge).

In various embodiments, electrode 350 may comprise a head 360 (e.g., front head, electrode head, interchangeable head, etc.). Head 360 may comprise a body 361 (e.g., a head body, a front head body, etc.) having a first head end 362 opposite a second head end 363. Body 361 may define a middle section 365 between first head end 362 and second head end 363.

Second head end 363 may be coupled to electrode body 351 (e.g., at first end 352). Second head end 363 may be coupled to electrode body 351 such that a portion of head 360 is received within electrode body 351. The portion of head 360 received within electrode body 351 may be less than half of head 360. In some embodiments, the portion of head 360 received within electrode body 351 may be 30% of head 360. In some embodiments, the portion of head 360 received within electrode body 351 may be less than 40% of head 360; less than 40%, 30%, or 20% of head 360; about 40%, 30%, or 20% of head 360; and/or any other similar portion of head 360 (wherein "about" as used in this context refers only to +/−5%).

In various embodiments, head 360 may comprise varying dimensions from first head end 362 to second head end 363. For example, head 360 may comprise an hourglass shape wherein first head end 362 and second head end 363 each comprise a greater diameter than middle section 365. First head end 362 may comprise a first diameter, second head end 363 may comprise a second diameter, and middle section 365 may comprise a third diameter (each diameter may also be referred to as a head diameter). The first diameter and the second diameter may each be greater than the third diameter (e.g., a middle section diameter). The first diameter may be less than the second diameter. The second diameter may be greater than the first diameter and the third diameter.

As discussed further herein, head 360 may be configured to receive an attachment. The attachment may be coupled to the middle portion of the head. The attachment may comprise varying thicknesses. For example, the attachment may comprise a first thickness proximate a portion of the attachment contacting first head end 362. The attachment may comprise a second thickness proximate a portion of the attachment contacting middle section 365. The first thickness and the first diameter may be substantially similar in size to the second thickness and the middle portion diameter. The first thickness and the first diameter may be less than or substantially similar in size to the second diameter. The second thickness and the middle section diameter may be less than or substantially similar in size to the second diameter.

In various embodiments, head 360 may comprise an electrically conductive material. For example, head 360 may comprise a metal material. Head 360 may comprise a metal alloy such as, for example, brass.

In various embodiments, electrode 350 may comprise a filament 387 (e.g., a wire-tether, a wire, etc.). Filament 387 may comprise an electrically conductive material configured to electrically couple electrode 350 to a cartridge, a magazine, and/or a CEW handle. In that regard, filament 387 may be configured to provide a stimulus signal and/or an ignition signal to electrode 350 via a signal generator of a CEW handle.

Filament 387 may comprise a first filament end 388 opposite a second filament end 389. First filament end 388 may be coupled to electrode 350. In some embodiments, first filament end 388 may be coupled to head 360. For example, first filament end 388 may be welded to head 360. As a further example, first filament end 388 may be coupled between head 360 and an inner surface of electrode body 351. For example, first filament end 388 may be inserted between head 360 and electrode body 351, and electrode body 351 may be press-fit (e.g., deformed, staked, etc.) to couple electrode body 351 to head 360. The press-fit between electrode body 351 and head 360 may couple first filament end 388 between electrode body 351 and head 360.

Second filament end 389 may extend aft electrode 350 and may be configured to couple within a cartridge and/or deployment unit. In that regard, head 360, filament 387, and a cartridge may be in electrical series.

In various embodiments, filament 387 may be electrically conductive from first filament end 388 to second filament end 389. For example, filament 387 may be non-insulated from first filament end 388 to second filament end 389.

In various embodiments, filament 387 may be insulated from first filament end 388 to second filament end 389. In that respect, only a portion of first filament end 388 coupled to head 360 and/or a portion of second filament end 389 coupled to the cartridge may be non-insulated.

In various embodiments, filament 387 may be stored in electrode body 351. For example, filament 387 may be wound in a winding (e.g., coils, filament winding, etc.). The winding may be stored within electrode body 351. During a deployment, electrode 350 may travel in a direction forward a cartridge. During travel, filament 387 may unravel (e.g., uncoil, unwind, etc.) from the winding to deploy filament 387 aft electrode body 351.

In various embodiments, electrode 350 may comprise a rear nozzle 355. Rear nozzle 355 may be disposed within electrode body 351. Rear nozzle 355 may be disposed within electrode body 351 proximate second end 353. Rear nozzle 355 may be disposed within electrode body 315 forward second end 353. For example, second end 353 may be configured to receive a portion of a piston in response to electrode 350 being disposed within a cartridge. In various embodiments, rear nozzle 355 may be disposed forward second end 353 such that rear nozzle 355 may not contact the piston (e.g., before a deployment of electrode 350 from the cartridge). In various embodiments, rear nozzle 355 may be disposed forward second end 353 such that rear nozzle 355 abuts the piston while electrode 350 is stored within the cartridge. In that regard, rear nozzle 355 may provide a contact surface configured to receive a force from the piston during a deployment. In some embodiments, rear nozzle 355 may be axially offset from second end 353.

Rear nozzle 355 may define an opening 356. Opening 356 may be radially centered within electrode body 351. Rear nozzle 355 may be configured to position filament 387 as filament 387 unwinds and exits electrode 350. For example, as filament 387 deploys from electrode 350, filament 387 moves through opening 356. Friction between an inner wall of opening 356 and filament 387 applies a force on filament 387. Applying a force on filament 387 during a deployment provides drag on electrode 350. Providing drag on electrode 350 increases stability of flight and accuracy of flight of electrode 350 along an intended trajectory. Increasing stability of flight and/or accuracy of flight may improve the repeatability of flight along intended trajectory of electrodes launched from different cartridges.

In various embodiments, opening 356 may further define a groove 357. Groove 357 may comprise an axial groove in opening 356 extending radially inward from opening 356 towards an inner surface of electrode body 351. Groove 357 may be sized and shaped to receive filament 387.

In various embodiments, groove 357 may position filament 387 prior to a deployment. During the deployment, filament 387 may unwind and may leave groove 357 (e.g., to contact opening 356). In various embodiments, groove 357 may position filament 387 prior to and during a deployment. For example, during the deployment filament 387 may remain within groove 357.

In various embodiments, second head end 363 may comprise one or more features, structures, and/or the like to aid in coupling filament 387 to head 360. For example, second head end 363 may comprise one or more features, structures, and/or the like to mechanically couple first filament end 388 to head 360 and/or to ensure that first filament end 388 remains mechanically coupled to head 360 before and after deployment of electrode 350, and before, during, and after an impact of electrode 350 with a target. Second end 363 may also comprise may comprise one or more features, structures, and/or the like to electrically couple first filament end 388 to head 360.

As previously discussed, filament 387 may be wound into a winding. In some embodiments, first filament end 388 may be wound into a winding onto head 363. For example, and in accordance with various embodiments, second head end 363 may comprise one or more circumferential channels. Each circumferential channel may be sized and/or shaped to receive and/or retain lengths of filament 387. In that respect, first filament end 388 may be wound circumferentially through the one or more circumferential channels of second head end 363 to couple first filament end 388 to second head end 363. In some embodiments, an end of first filament end 388 may extend forward second head end 363 and proximate middle section 365.

In various embodiments, head 360 may be configured to receive one or more attachments (e.g., head attachments, accessories, etc.). Head 360 may be configured to receive a single attachment. Head 360 may be configured to receive a plurality of attachments. An attachment may be configured to couple to a front surface (e.g., a radially forward surface) of first head end 362. An attachment may be configured to couple to an axially outer surface of first head end 362. An attachment may be configured to couple to head 360 proximate middle section 365 between first head end 362 and second head end 363. In some embodiments, an attachment may be configured to couple to head 360 at one or more of a front surface, an axially outer surface, and/or middle section 365 of head 360.

First head end 362 may be configured to receive a first attachment configured to enable electrode 350 to couple to a target. For example, the first attachment may comprise a spear, a hook, a barb, a training attachment, a hook and loop attachment, and/or the like. In some embodiments, the first attachment may comprise an electrically conductive material.

First head end 362 may be configured to receive a second attachment configured to provide a property to electrode 350. The property may comprise a physical property, a physical characteristic, and/or the like. For example, the property may comprise an aerodynamic property. In that regard, the second attachment may be coupled to head 360 and configured to change an aerodynamic property or characteristic of electrode 350 (e.g., lift, drag, etc.). As a further example, the property may comprise a force absorbing property. In that regard, the second attachment may be coupled to head 360 and configured to at least partially reduce an impact force of electrode 350 against a target. The second attachment may at least partially absorb a force of impact with a target thereby reducing potential tissue or skin damage (e.g., bruising, tearing, etc.) to the target. The second attachment may reduce a momentum of electrode 350 after impact with a target, thereby hindering (e.g., preventing) electrode 350 from bouncing off of (e.g., deflecting) the target with enough residual force to decouple electrode 350 from a surface (e.g., clothing, tissue, etc.) of the target. The second attachment may comprise a pad, a shock absorber, a thermoplastic elastomer, a rubber, and/or the like. In various embodiments, the second attachment may comprise an electrically non-conductive material.

In various embodiments, a first attachment and a second attachment may couple to head 360 at first head end 362. In some embodiments, a second attachment may couple to each of head 360 and the first attachment. In various embodiments, head 360 may comprise a first mechanical feature configure to receive the first attachment and a second mechanical feature configured to receive the second attachment. The first mechanical feature may comprise an opening, channel, groove, protrusion, or the like. The second mechanical feature may comprise a shape of head 360.

In various embodiments, first head end 362 may be sized and shaped to receive one or more attachments. For example, first head end 362 may comprise a channel 364 (e.g., head channel, attachment channel, etc.) configured to allow an attachment to couple to head 360. Channel 364 may define an opening on first head end 362 extending into a body of head 360. Channel 364 may not extend through to second head end 363. Channel 364 may be configured to receive a first attachment.

In some embodiments, electrode 350 may comprise a spear coupled within channel 364. For example, the spear may be coupled within channel 364 mechanically or chemically. A mechanical coupling may comprise an interference fit, a press fit, a deformation, or the like. A chemical coupling may include an adhesive, and/or the like. The spear may be coupled within channel 364 such that a gap exists between an end of the spear and an inner end of channel 364. In other embodiments, an end of the spear may abut against (e.g., contact) an inner end of channel 364.

First head end 362 may comprise a shape configured to receive an attachment. For example, head 360 at first head end 362 may comprise a "T-shape" wherein an outer portion of first head end 362 (e.g., a first portion) comprises a greater diameter than an inner portion of head end 362 (e.g., a second portion). The T-shape may be configured to receive a second attachment. The outer portion and the inner portion of first head end 362 may further at least partially define channel 364. The outer portion of first head end 362 may be axially forward the inner portion of first head end 362.

In various embodiments, and with reference to FIGS. 3A, 3B, 4A, and 4B, a training attachment 370 is disclosed. Training attachment 370 may comprise an attachment body 371 having a first attachment end 372 (e.g., a forward attachment end) opposite a second attachment end 373 (e.g., an aft attachment end).

Training attachment 370 may be coupled to head 360. Training attachment 370 may be coupled to head 360 using a mechanical coupling, a chemical coupling, and/or the like. Training attachment 370 may couple to head 360 at second attachment end 373. Training attachment 370 may be coupled to first head end 362. Training attachment 370 may be coupled to head 360 forward second head end 363. Training attachment 370 may be coupled to middle section 365. Training attachment 370 may be coupled to a T-shape defining first head end 362. Training attachment 370 may comprise an outer surface radially outward an outer surface of head 360. Training attachment 370 may comprise an aft inner surface that is radially inward from first head end 362 and second head end 363, but radially outward from middle section 365 of head 360. The aft inner surface may be defined at or proximate to second attachment end 373. The aft inner surface may be axially aft first head end 362 and axially forward second head end 363. Training attachment 370 may extend forward head 360.

In various embodiments, training attachment 370 may comprise an electrically non-conductive material, such as a rubber, a plastic, and/or the like. In that regard, training attachment 370 may not be in electrical series with head 360 and/or filament 387.

In various embodiments, attachment body 371 may comprise an attachment base 377 opposite an attachment elongated extension 378. Attachment base 377 may be defined at second attachment end 373. Attachment elongated extension 378 may be defined at first attachment end 372. Attachment base 377 may be coupled to head 360.

Attachment base 377 may comprise a diameter greater than a diameter of attachment elongated extension 378 (e.g., a first diameter of attachment base 377 is greater than a second diameter of attachment elongated extension 378). Attachment elongated extension 378 may comprise a length greater than a length of attachment base 377 (e.g., a first length of attachment elongated extension 378 is greater than a second length of attachment base 377).

In various embodiments, training attachment 370 may be configured to allow electrode 350 to couple to a training surface, such as a training target, a training suit, and/or the like. For example, training attachment 370 may comprise a plurality of hooks configured to engage a plurality of loops on the training surface (e.g., hook and loop fastening). Each hook may extend in an outward direction from training attachment 370. As a further example, training attachment 370 may comprise a plurality of loops configured to engage a plurality of hooks on the training surface (e.g., hook and loop fastening). The respective hooks and/or loops of training attachment 370 and the training surface may engage each other to couple training attachment 370, and electrode 350, to the training surface. The respective hooks and/or loops of training attachment 370 may be disposed along training attachment 370 in a location capable of coupling training attachment 370 to the training surface.

In various embodiments, training attachment 370 may comprise one or more structures, features, or the like configured to aid training attachment 370 in coupling to a training surface. For example, training attachment 370 may comprise a plurality of wings 390 coupled to first attachment end 372. For example, wings 390 may comprise two wings, three wings, four wings, and/or the like. Each wing of the plurality of wings 390 may be circumferentially disposed along first attachment end 372. Each wing of the plurality of wings 390 may comprise a flap 391. Flap 391 may be disposed (e.g., positioned) axially rearward along attachment elongated extension 378. Flap 391 may be disposed (e.g., positioned) axially forward attachment base 377. Flap 391 may be configured to couple to first attachment end 372.

In various embodiments, wings 390 may be coupled to first attachment end 372 using any suitable process or technique. For example, wings 390 may be mechanically and/or chemically coupled to first attachment end 372. Wings 390 may be coupled to first attachment end 372 using a cold staking process, a hot staking process, and/or the like. Wings 390 may be coupled to first attachment end 372 using an ultrasonically welded pin.

In various embodiments, attachment body 371 may define an attachment channel 374 from first attachment end 372 through second attachment end 373. Attachment channel 374 may be coaxial with channel 364. Attachment channel 374 may comprise a diameter greater than a diameter of channel 364. Attachment channel 374 may be sized and shaped to receive a pin 395. Pin 395 may be inserted into attachment channel 374 to couple wings 390 to first attachment end 372. Pin 395 may position and couple a portion of wings 390 between pin 395 and first attachment end 372. The portion of wings 390 may comprise an opening through which pin 395 is received. Pin 395 may comprise any suitable shape. For example, in some embodiments pin 395 may comprise a T-shape. In some embodiments, pin 395 may comprise a front surface having a curved surface. In some embodiments, pin 395 may comprise any other suitable shape capable of coupling wings 390 to first attachment end 372.

In various embodiments, one or more wings 390 may comprise a mating surface 392. Mating surface 392 may be disposed on flap 391. Mating surface 392 may be configured to couple training attachment 370 to a training surface. Mating surface 392 may comprise any suitable material, structure, and/or the like configure to couple to a training surface. For example, mating surface 392 may comprise a plurality of hooks configured to engage a plurality of loops on the training surface (e.g., hook and loop fastening). Each hook may extend in an outward direction from a respective wing 390. As a further example, mating surface 392 may comprise a plurality of loops configured to engage a plurality of hooks on the training surface (e.g., hook and loop fastening). The respective hooks and/or loops of a respective wing 390 and the training surface may engage each other to couple training attachment 370, and electrode 350, to the training surface.

In various embodiments, training attachment 370 may be configured to operate from a first position (e.g., a stowed position, a closed position, etc.) to a second position (e.g., a deployed position, an open position, etc.). In the first position, and as depicted in FIGS. 3A and 3B, wings 390 may be disposed against attachment elongated extension 378 (e.g., disposed in an axial direction).

In some embodiments, training attachment 370 may remain in the first position before and during a deployment of electrode 350. For example, before a deployment, electrode 350 may be positioned within a cartridge. Wings 390 may remain disposed against attachment elongated extension 378 while within the cartridge. During a deployment, electrode 350 may experience air pressure and forces as electrode 350 flies toward a target or training surface. The air pressure and forces may cause wings 390 to remain disposed against attachment elongated extension 378.

In the first position, the mating surfaces of training attachment 370 (e.g., mating surfaces 392 disposed on flaps 391 of wings 390) may be located on radially outward surfaces of training attachment 370. An axially forward surface of training attachment 370 (e.g., pin 395) may not comprise a mating surface (e.g., the axially forward surface comprises a smooth surface).

Figure 4A:
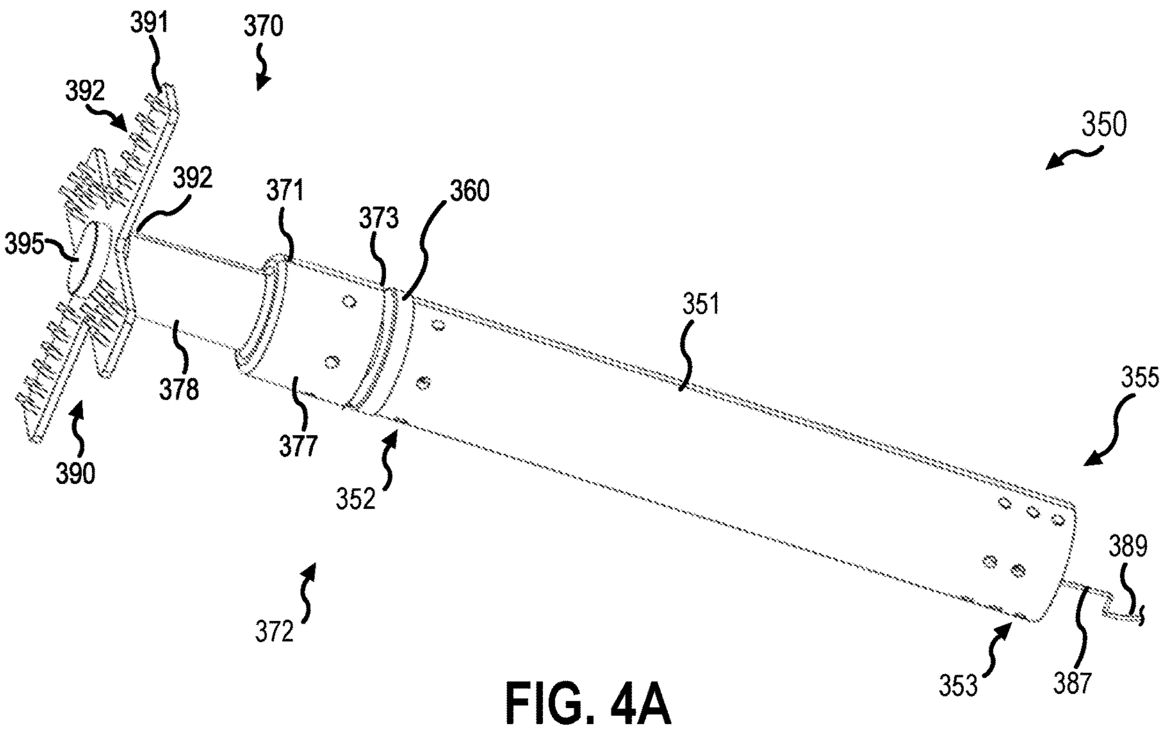
FIGS. 4A and 4B are perspective and cross-sectional views of an electrode with a training attachment in a second position, in accordance with various embodiments.
Figure 4B:
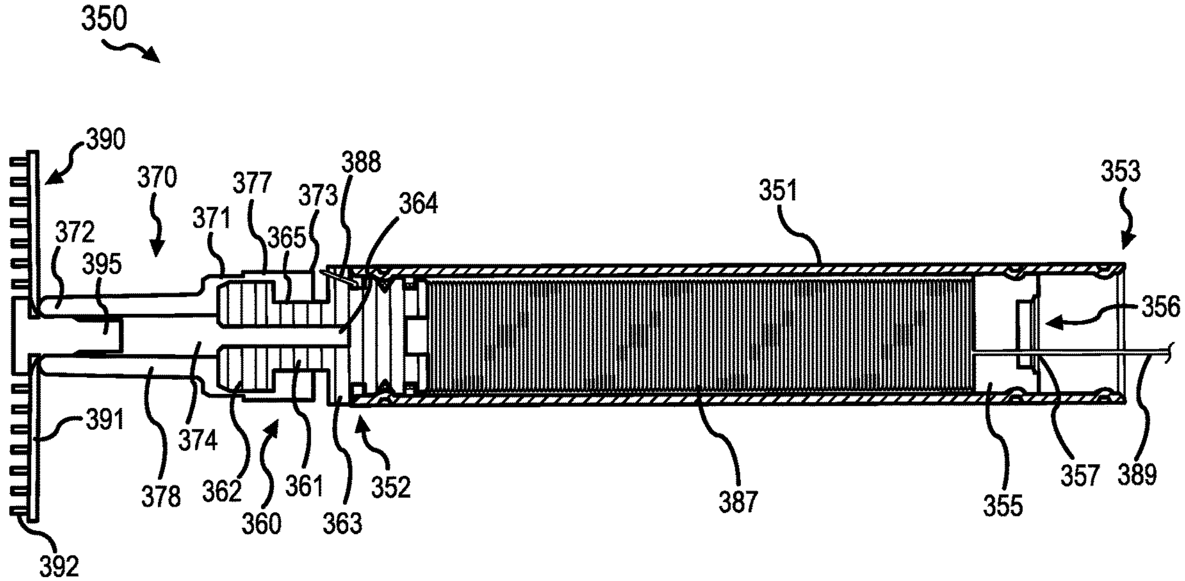

In the second position, and as depicted in FIGS. 4A and 4B, wings 390 may be disposed outward from attachment elongated extension 378 (e.g., disposed in a radial direction).

In some embodiments, training attachment 370 may transition from the first position to the second position responsive to an impact of training attachment 370 against a training surface, a target, and/or the like. For example, responsive to the impact, electrode 350 may receive an impact force cause wings 390 to move in a radially outward direction. As wings 390 are not coupled to attachment body 371 aft of first attachment end 372, wings 390 may rotate about the coupling point to first attachment end 372, and the rearward end of each flap 391 may travel radially outward. The radially forward position of the mating surfaces disposed on flaps 391 of wings 390 may enable the mating surfaces to contact and couple to the training surface, the target, and/or the like. A surface of each of one or more wings 390 opposite a mating surface 392 may lack an adhesive (i.e., comprise a non-adhesive surface) and/or other mechanical fastener in order to enable wings 390 to transition to the second position.

In the second position, the mating surface of training attachment 370 (e.g., mating surfaces 392 disposed on flaps 391 of wings 390) may be located on axially forward surfaces of training attachment 370. A radially outward surface of training attachment 370 may no longer comprise a mating surface.

In various embodiments, attachment body 371 may comprise a different material than wings 390. For example, attachment body 371 may comprise a first material and wings 390 may comprise a second material. The first material may be different from the second material. In some embodiments, the first material may be configured to provide structure to attachment body 371. The second material may be configured to aid wings 390 in moving between the first position and the second position. The second material may be configured to aid wings 390 in coupling to a training surface. In some embodiments, the first material may comprise a plastic material.

In various embodiments, an electrode for a conducted electrical weapon is disclosed. The electrode may comprise an electrode body, an electrode head, and a training attachment. The electrode head may be coupled to the electrode body. The training attachment may be coupled to the electrode head. The training attachment may comprise an attachment elongated extension opposite an attachment base. The training attachment may comprise a plurality of wings coupled to a forward surface of the attachment elongated extension, and the plurality of wings may be configured to operate from a first position to a second position responsive to an impact of the training attachment with a target.

In various embodiments of the above electrode, each wing of the plurality of wings may comprise a mating surface configured to couple to the target in the second position. In various embodiments of the above electrode, each wing of the plurality of wings may be axially disposed along the attachment elongated extension in the first position. The plurality of wings may be disposed forward the attachment base in the first position and the second position. In various embodiments of the above electrode, the attachment base may comprise a first diameter, the attachment elongated extension may comprise a second diameter, and the first diameter may be greater than the second diameter. In various embodiments of the above electrode, the attachment base may comprise a first length, the attachment elongated extension may comprise a second length, and the second length may be greater than the first length. In various embodiments of the above electrode, the training attachment may comprise a channel defined through the attachment elongated extension and the attachment base. A pin may be inserted into the channel at the attachment elongated extension. The pin may couple the plurality of wings to the forward surface of the attachment elongated extension. Each wing of the plurality of wings may comprise a mating surface, and the pin may comprise a smooth surface.

In various embodiments, a training attachment for a projectile of a conducted electrical weapon is disclosed. The training attachment may comprise an attachment body defining an attachment elongated extension opposite an attachment base. The training attachment may comprise a plurality of wings coupled to a front surface of the attachment elongated extension and extending axially aft the front surface of the attachment elongated extension. The training attachment may comprise a pin inserted into the front surface of the attachment elongated extension, and the pin may be configured to couple the plurality of wings to the front surface of the attachment elongated extension.

In various embodiments of the above training attachment, the pin may comprise a T-shape. In various embodiments of the above training attachment, the attachment body may comprise a channel defined through the attachment elongated extension and the attachment base, and the pin may be inserted into the channel. In various embodiments of the above training attachment, each wing of the plurality of wings may comprise a flap disposed against the attachment elongated extension. The flap may comprise a mating surface configured to couple to a training surface.

In various embodiments, an electrode for a conducted electrical weapon is disclosed. The electrode may comprise an electrode body, an electrode head, and a training attachment. The electrode head may be coupled to the electrode body, and the electrode head may comprise a first head end opposite a second head end. The training attachment may be coupled to the electrode head between the first head end and the second head end. The training attachment may comprise a plurality of wings coupled to a forward surface of the training attachment, and the plurality of wings may be configured to operate from a first position to a second position responsive to an impact of the training attachment with a target.

In various embodiments of the above electrode, in the first position the plurality of wings may be disposed in an axial direction towards the electrode head, and in the second position the plurality of wings may be disposed in a radial direction. In various embodiments of the above electrode, the training attachment may comprise a mating surface. In the first position the mating surface may be located on a radially outward surface of the training attachment. In the second position the mating surface may be located on an axially forward surface of the training attachment.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Systems, methods, and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A training electrode for a conducted electrical weapon comprising:

an electrode body;

an electrode head coupled to the electrode body, wherein the electrode head is not configured to penetrate a target's tissue; and a training attachment coupled to the electrode head, wherein the training attachment comprises:

an attachment elongated extension opposite an attachment base; and a plurality of wings coupled to a forward surface of the attachment elongated extension, wherein the plurality of wings are configured to operate from a first position to a second position responsive to an impact of the training attachment with a target.

2. The training electrode of claim 1, wherein each wing of the plurality of wings comprises a mating surface configured to couple to the target in the second position.

3. The training electrode of claim 1, wherein each wing of the plurality of wings is axially disposed along the attachment elongated extension in the first position.

4. The training electrode of claim 3, wherein the plurality of wings are disposed forward the attachment base in the first position and the second position.

5. The training electrode of claim 1, wherein the attachment base comprises a first diameter, wherein the attachment elongated extension comprises a second diameter, and wherein the first diameter is greater than the second diameter.

6. The training electrode of claim 1, wherein the attachment base comprises a first length, wherein the attachment elongated extension comprises a second length, and wherein the second length is greater than the first length.

7. The training electrode of claim 1, wherein the training attachment comprises a channel defined through the attachment elongated extension and the attachment base.

8. The training electrode of claim 7, further comprising a pin inserted into the channel at the attachment elongated extension.

9. The training electrode of claim 8, wherein the pin couples the plurality of wings to the forward surface of the attachment elongated extension.

10. The training electrode of claim 8, wherein each wing of the plurality of wings comprises a mating surface, and wherein the pin comprises a smooth surface.

11. A training attachment for a projectile of a conducted electrical weapon, the training attachment comprising:

an attachment body defining an attachment elongated extension opposite an attachment base;

a plurality of wings coupled to a front surface of the attachment elongated extension and extending axially aft the front surface of the attachment elongated extension; and a pin inserted into the front surface of the attachment elongated extension, wherein the pin is configured to couple the plurality of wings to the front surface of the attachment elongated extension.

12. The training attachment of claim 11, wherein the pin comprises a T-shape.

13. The training attachment of claim 11, wherein the attachment body comprises a channel defined through the attachment elongated extension and the attachment base, and wherein the pin is inserted into the channel.

14. The training attachment of claim 11, wherein each wing of the plurality of wings comprises a flap disposed against the attachment elongated extension.

15. The training attachment of claim 14, wherein the flap comprises a mating surface configured to couple to a training surface.

16. A training electrode for a conducted electrical weapon comprising:

an electrode body;

an electrode head coupled to the electrode body, wherein the electrode head comprises a first head end opposite a second head end; and a training attachment coupled to the electrode head between the first head end and the second head end, wherein the training attachment comprises:

a plurality of wings coupled to a forward surface of the training attachment, wherein the plurality of wings are configured to operate from a first position to a second position responsive to an impact of the training attachment with a target.

17. The training electrode of claim 16, wherein in the first position the plurality of wings are disposed in an axial direction towards the electrode head, and wherein in the second position the plurality of wings are disposed in a radial direction.

18. The training electrode of claim 16, wherein the training attachment comprises a mating surface.

19. The training electrode of claim 18, wherein in the first position the mating surface is located on a radially outward surface of the training attachment.

20. The training electrode of claim 18, where in the second position the mating surface is located on an axially forward surface of the training attachment.

* * * * *